United States Patent
Yamaguchi

[19]

[11] Patent Number: 5,867,227
[45] Date of Patent: *Feb. 2, 1999

[54] TELEVISION RECEIVER

[75] Inventor: Koichi Yamaguchi, Saitama-ken, Japan

[73] Assignee: Kabushiki Kaisha Toshiba, Kanagawa-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 608,250

[22] Filed: Feb. 28, 1996

[30] Foreign Application Priority Data

Feb. 28, 1995 [JP] Japan ................................. 7-040509

[51] Int. Cl.$^6$ .................................................. H04N 5/445
[52] U.S. Cl. ........................... 348/564; 348/565; 348/566
[58] Field of Search .................................... 348/564, 565, 348/566, 567, 568; H04N 5/445

[56] References Cited

U.S. PATENT DOCUMENTS

| | | | |
|---|---|---|---|
| 4,914,516 | 4/1990 | Duffield | 348/565 |
| 5,144,438 | 9/1992 | Kim | 348/565 |
| 5,251,034 | 10/1993 | Na | 348/564 |
| 5,420,641 | 5/1995 | Tsuchida | 348/565 |
| 5,420,642 | 5/1995 | Baek | 348/565 |
| 5,453,796 | 9/1995 | Duffield et al. | 348/565 |
| 5,537,152 | 7/1996 | Ishikawa . | |
| 5,537,153 | 7/1996 | Shigihara | 348/564 |
| 5,576,769 | 11/1996 | Lendaro | 348/564 |
| 5,682,207 | 10/1997 | Takeda et al. . | |

FOREIGN PATENT DOCUMENTS

| | | |
|---|---|---|
| 2-8265 | 1/1990 | Japan . |
| A 02-13182 | 1/1990 | Japan . |
| 5-153515 | 6/1993 | Japan . |
| 2 275 585 | 8/1994 | United Kingdom . |

Primary Examiner—Andrew I. Faile
Assistant Examiner—Vivek Srivastava
Attorney, Agent, or Firm—Pillsbury Madison & Sutro LLP

[57] ABSTRACT

A television receiver for searching and displaying pictures from multiple TV channels can display at least two parallel screens. Each screen is capable of simultaneously displaying picture signals from first and second tuners. The receiver includes an interface for receiving a signal from a user to begin a channel-search operation. A memory stores the screen mode existing before the channel search command was received. A multi-window view displays a plurality of pictures such that a user can perform the channel search operation to select a desired channel picture signal. After the channel search operation is completed, a controller coupled with the memory automatically returns the display to the original screen mode view at the time the channel search function was requested.

13 Claims, 6 Drawing Sheets

TELEVISION RECEIVER

FIELD OF THE INVENTION

The present invention generally relates to a decoder, and more particularly, to a television receiver which provides a multi-window view for splitting and simultaneously displaying pictures of a plurality of broadcasting stations.

BACKGROUND OF THE INVENTION

There are television receivers which provide a multi-screen view, e.g., a double-screen view comprising a main screen view on one side of a display and a sub-screen view of almost the same size on the other side of the display.

An example of such a conventional television receiver will be described hereinafter, in reference to FIGS. 5 and 6.

As shown in FIG. 5, such a television receiver has two tuners 21 and 22 respectively selecting pictures from desired channel broadcast TV signals, under a control of a controller 29. These first and second tuners 21 and 22 each have a picture signal processing unit for converting the received TV signal into an intermediate frequency (IF) picture signal.

These IF picture signals are combined into a double-screen view signal in a multi-screen processor 26 and then applied to a display 28 such as a CRT. Thus, the display 28 provides a double-screen view comprising a main screen view based on the first picture signal on one side of a display and a sub-screen view based on the second picture signal on the other side of the display at almost the same sizes.

In the double-screen view mode, the first and second picture signals from the first and second tuners 21 and 22 are compressed in the horizontal direction by a factor of two by a main picture compressor 24 and a sub-picture compressor 25, respectively, so that their horizontal sizes are reduced by ½. Then the compressed picture signals from the main picture compressor 24 and the sub-picture compressor 25 are combined in the multi-screen processor 26. The combined picture signal is then supplied to the display 28. At this time, a switch SW5 is controlled by a controller 29 so as to establish a signal path M to provide a double-screen view signal from the multi-screen processor 26 to the display 28.

Further, a direct signal path N is provided for supplying the first picture signal from the first tuner 21 to the display 28 in a bypassing manner over the circuit units 24, 26 etc. Thus, the direct signal path N is established under a control of a controller 29, the conventional single-screen view responding to only the first picture signal is displayed on the display 28 through the direct signal path N.

Therefore, in the double-screen view mode, the first picture signal selected by the first tuner 21 can be displayed through the main screen X and the pictures selected by the other tuner can be displayed on the sub-screen Y as shown in FIG. 6, while in the single-screen mode, the pictures selected by the first tuner 21 can be displayed on the single-screen.

Among such television receivers described above, there are some receivers that have been designed to display pictures on the main screen and the pictures received from other broadcasting stations on the sub-screen as reduced-size pictures so as to give convenience to users in selecting channels. Such a function is called the channel-search function and has been added to double-screen television receivers as a new function in these years because this function facilitates the channel-search while displaying multi-window view (hereinafter, referred to as the search-screen) as shown in the figure.

In a pending Japanese patent application (Tokugan Hei) No. 7-30880, assigned to the same applicant of the present patent application, a television receiver for displaying multi-window view on a sub-screen is proposed. In the co-pending application, it is also proposed that a channel-search operation for selecting a desired broadcast TV signal is carried out on a multi-window view provided on the sub-screen of the display by locating a cursor on a desired channel picture in one of the multiple windows.

The channel-search technique proposed in the Japanese application is advantageous because it continuously displays the current picture on the main screen while searching for a desired channel picture on the sub-screen. However, the proposed technique has a problem that after the completion of the channel-search operation, the display the screen mode just before the channel-search operation is lost. Thus, the user is required to manually reset the screen mode on the display.

Television receivers as proposed in the pending application, as well as conventional television receivers have a problem that users are required to manually reset the current display to a desired channel display.

SUMMARY OF THE INVENTION

It is, therefore, an object of the present invention to provide a television receiver capable of automatically resetting the screen mode on a particular after a channel-search operation has been carried out on the display.

In order to achieve the above object, a television receiver according to the first aspect of the present invention includes an input circuit for receiving broadcast TV signals, an interface for interfacing a user's instruction, a first tuner for generating a first picture signal selected from the broadcast TV signals from the receiving means in response to the user's instruction from the interface, a second tuner for generating a second picture signal from the broadcast TV signals from the receiving means in response to the user's instruction from the interface, a display for displaying pictures corresponding to the picture signals from the first and second tuners, a multi-screen processor for providing at least two parallel screens on the display, each being capable of simultaneously displaying the picture signals from the first and second tuners, a multi-window processor responsive to the picture signal from the second tuner for providing a multi-window view capable of presenting a plurality of pictures responsive to the broadcast TV signals on the display, in either a single-screen mode or a multi-screen mode based on an instruction from the interface, whereby a user is able to perform a channel-search operation to select a desired channel picture signal, and a controller responsive to the completion of the channel-search operation for automatically returning to the original screen mode view before the channel-search operation and providing the selected channel picture signal to the display.

A television receiver according to the second aspect of the present invention includes an input circuit for receiving broadcast TV signals, an interface for interfacing a user's instruction, a first tuner for generating a main picture signal selected from the broadcast TV signals from the receiving means in response to the user's instruction from the interface, a second tuner for selectively generating a sub-picture signal selected from the broadcast TV signals or a channel-search mode signal from the receiving means in response to the user's instruction from the interface, a display for displaying pictures, a first switch for selectively outputting signals from the first tuner and signals from the second tuner, a main picture compressor for outputting main picture signal from the first tuner by compressing them in the horizontal direction, a sub-picture compressor for compressing a sub-picture signal from the second tuner in the horizontal direction, a multi-window processor for outputting picture signals from broadcasting stations from the second tuner, which are received in the channel-search view mode, by splitting and compressing them in the horizontal and vertical directions for display on multiple screens as reduced-size pictures, a second switch for selectively outputting signals from the sub-picture compressor and signals from the multi-window processor, a multi-screen processor for combining the picture signals from the second switch and the main picture signal from the main picture compressor, a third switch for selectively providing the picture signal from the multi-screen processor or the picture signal from the first switch to the display, and a controller responsive to the interface for controlling the respective units in the television receiver so as that when a direct signal path from the first tuner to the display is selected by the first and third switches to display multiple pictures in the single-screen mode, the controller switches the second and third switches to a signal path from the multi-window processor when the channel-search operation is carried out and displays the multi-window view on the display, and after the channel-search operation associated with the second tuner has been completed based on the multi-window view, the controller switches the second tuner from the channel-search view mode to the sub-picture display mode and also switches the first and third switch to display the picture signal from the second tuner on the display, and when pictures are displayed in the multi-screen mode, the second switch is switched to the signal path from the multi-window processor for carrying out the channel-search operation to display the multi-window view on the display, while after the channel-search operation for the second tuner has been completed based on the multi-window, processor, the second tuner is changed from the channel-search view mode to the sub-picture display mode, and also the second switch is switched to the signal path from the sub-picture compressor to display picture signals from the first and second tuners on the main screen and the sub-screen of the display.

Further to the second aspect of the television receiver, in a television receiver according to the third aspect of the present invention the controller includes a memory for storing the setting states of the first, second and third switches and the terminal selecting states in the switches just before the channel-search operation is instructed in order to return to the screen mode previously taken just before the channel-search operation has been instructed.

A television receiver according to the fourth aspect of the present invention includes an input circuit for receiving broadcast TV signals, an interface for interfacing a user's instruction, a first tuner for generating a main picture signal selected from the broadcast TV signals from the receiving means in response to the user's instruction from the interface, a second tuner for selectively generating a sub-picture signal selected from the broadcast TV signals or a channel-search mode signal from the receiving means in response to the user's instruction from the interface, a display for displaying pictures, a first switch for switching individual tuning control signals to the first and second tuners with each other, a main picture compressor for outputting the main picture signal from the first tuner by compressing them in the horizontal direction, a sub-picture compressor for compressing a sub-picture signal from the second tuner in the horizontal direction, a multi-window processor for outputting the picture signals from of broadcasting stations from the second tuner, which are received in the channel-search view mode, by splitting and compressing them in the horizontal and vertical directions for display on multiple screens as reduced-size pictures, a second switch for selectively outputting signals from the sub-picture compressor and signals from the multi-window processor, a multi-screen processor for combining the picture signals from the second switch and main picture signal from the main picture compressor, a third switch for selectively providing the picture signal from the multi-screen processor or the picture signal from the first switch to the display, and a controller responsive to the interface for controlling the respective units in the television receiver so as that when direct signal path from the first tuner to the display is selected by the third switch to display multiple pictures in the single-screen mode, the controller switches the second and third switches to a signal path from the multi-window processor when the channel-search operation is carried out and displays the multi-window view on the display, and after the channel-search associated with the second tuner has been completed based on the multi-window view the first switch is switched to change the individual tuning control signals to the first and second tuners with each other to display the picture signal from the first tuner on the display, and when pictures are displayed in the multi-screen mode, the second switch is switched to the signal path from the multi-window processor for carrying out the channel-search operation to display the multi-window view on the display, while after the channel-search operation for the second tuner has been completed based on the multi-window processor the second tuner is changed from the channel-search view mode to the sub-picture display mode, and also the second switch is switched to the signal path from the sub-picture compressor to display picture signals from the first and second tuners on the main screen and the sub-screen of the display.

Further to the fourth aspect of the television receiver, in a fifth aspect of the television receiver the controller includes a memory for storing the terminal selecting states in the first, second and the third switches as well as the operating states of the respective units of the television receiver before the channel-search operation is instructed in order to return to the previous setting states of the switches.

In the invention as claimed in the claims described above, it is possible to perform the channel-search on the search-screen when selecting channels and after completing the channel-search, and the selected pictures can be displayed while automatically returning to the screen mode existing (the single-screen mode or the double-screen mode) just before performing the channel-search without performing any additional steps.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Preferred embodiments of the present invention will be described in detail with reference to the FIGS. 1 through 4.

Figure 1:
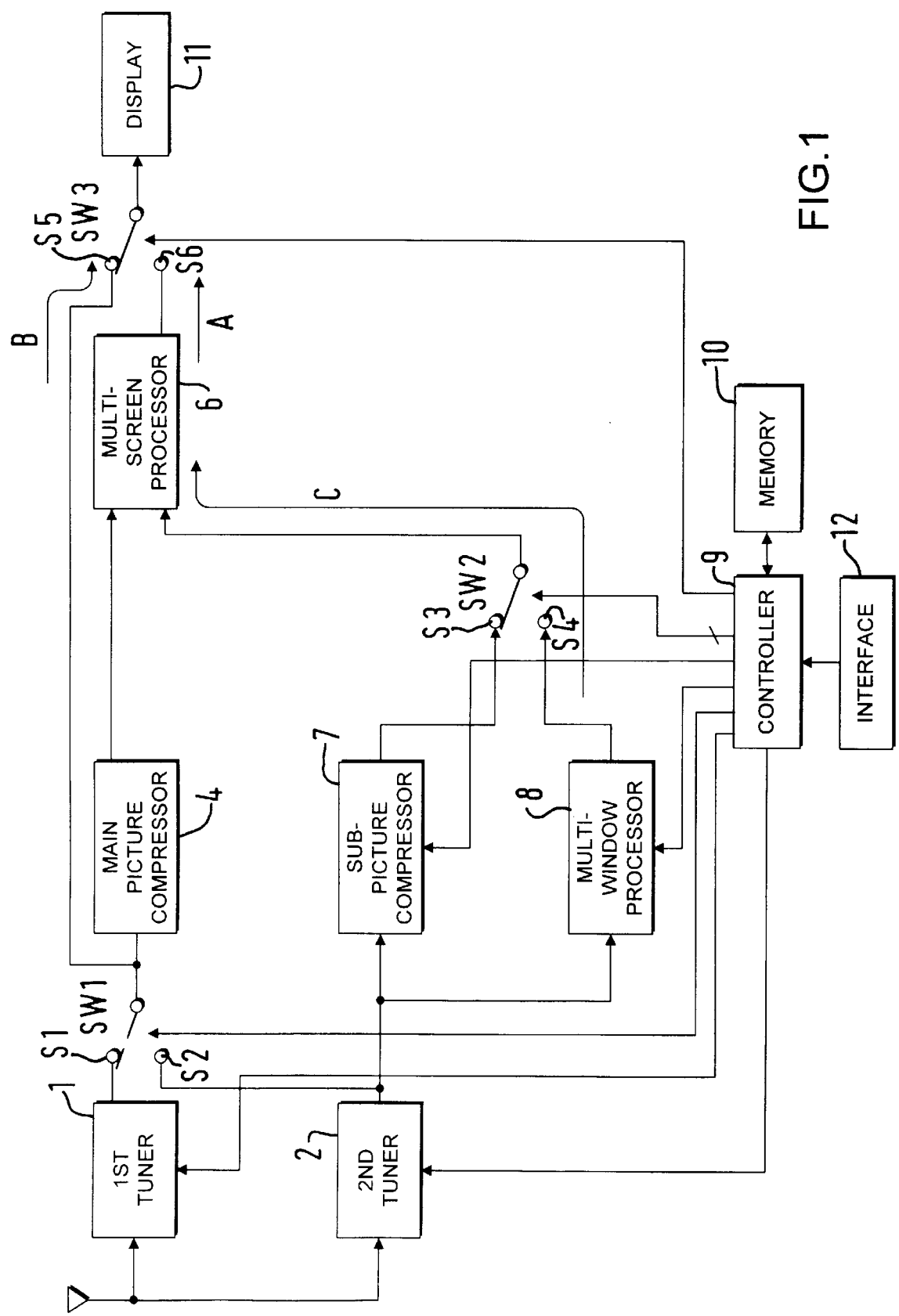
FIG. 1 is a block diagram showing a first embodiment of a television receiver according to the present invention.

FIG. 1 shows a first embodiment of the television receiver according to the present invention.

As shown in FIG. 1, the exemplary television receiver is provided with two tuners, i.e., first and second tuners 1 and 2, which respectively select desired channel broadcast TV signals according to a control signal from a controller (e.g., a microprocessor) 9 and then converts the received TV signal to an intermediate frequency (IF) picture signal. The first and the second tuners 1 and 2 respectively include a picture signal processor for carrying out a prescribed signal processing. Further, an interface 12 coupled with the controller 9 is provided for interfacing user's instructions controller 9. Thus the controller provides prescribed tuning signals as defined by the instruction to the first and the second tuners 1 and 2.

The picture signals from the first and second tuners 1 and 2 are combined into a double-screen picture in a multi-screen processor 6. Thus the double-screen picture of the combined main and sub-pictures is displayed on a display 11, for instance, a CRT.

In the double-screen mode, the main and sub-picture signals from the first and second tuners 1 and 2 are compressed in a main picture compressor 4 and a sub-picture compressor 7, respectively, so that, the widths of their displayed pictures are reduced by ½. The compressed picture signals are combined in the multi-screen processor 6 as described above. At this time, a switch (referred to as a third switch) SW3 is so controlled by the controller 9 that it establishes a signal path A through which the double-screen picture signal is supplied from the multi-screen processor 6 to the display 11.

Further, another signal path B can be established between the first tuner 1 and the display 11 instead of the signal path A, thus bypassing the main picture compressor 4 and the multi-screen processor 6. When the signal path B is established under the control of the controller 9, only the first picture signal obtained by the first tuner 1 is displayed in the full screen on the display 11 in the single-screen mode.

In addition, a multi-window processor 8 is provided in coupled with the second tuner 2. The multi-window processor 8 provides a multi-window view as described later in the sub-screen provided by the multi-screen processor 6 instead of the second picture from the sub-picture compressor 7. Further, in this embodiment the controller 9 is coupled to a memory 10. Thus the memory 10 stores operating states of first and second switches SW1, SW2 as described later, as well as the operating state of the third switch SW3 and furthermore the same of the other circuit units in the television receiver, just before the channel-search operation is carried out so as that a screen mode before the channel-search operation is automatically restored once the channel-search operation is completed.

The multi-window view provided by the multi-window processor 8 can be advantageously used in carrying out the channel-search operation. For this purpose, the second tuner 2 outputs a plurality of broadcast channel picture signals, instead of outputting only the second picture signal, when so instructed from the interface 12 through the controller 9. The multi-window view operation in the second tuner 22 is carried out by successively tuning the broadcast channels. The successive picture signals of broadcast channels are prepared to the multi-window view signal in the multi-window processor 8.

In the channel-search view mode the second and third switches SW2 and SW3 are controlled to establish a signal path C for supplying the multi-window view signal from the multi-window processor 8 to the display 11 through the multi-screen processor 6, under the control of the controller 9 so that the multi-window view signal from the multi-window processor 8 can be displayed on the display 11 in either the single-screen mode or the double-screen mode, i.e., the full screen or the sub-screen on the display 11. Thus, the multi-window view mode will be occasionally referred to as a channel-search view mode.

Accordingly, in the double-screen mode or the multi-screen mode, the first picture signal from the first tuner 1 is displayed in the main screen on the display 11, while the second picture from the second tuner 2 in the double-picture view mode is displayed in the sub-screen on the display 12. Furthermore, the channel-search screen or the multi-window view prepared by the multi-window processor 8 is typically displayed in the sub-screen on the display 11 instead of the second picture. Further, the multi-window view prepared by the multi-window processor 8 ca be displayed in the single-screen mode, i.e., in the full screen on the display 11. Thus, in this case the full screen of the display 11 is exclusively used for the channel-search operation.

Now, the operations of the switches SW1, SW2 and SW3 for changing the display modes or the view modes on the display 11 will be described in detail. To make it comprehensive, the switches SW1, SW2 and SW3 are referred to as the first switch, the second switch and the third switch, in the order. Further, to indicate the signal paths selectively established by the switches SW1, SW2 and SW3, their switch terminals are assigned with references S1 through S6, respectively.

First, the channel-search operation carried out in the single-screen mode will be described.

In the single-screen mode, the third switch SW3 is connected to the switch terminal S5 so as to deliver the first picture signal from the first tuner 1 or the second picture signal from the second tuner 2 to the display 11. At this time, if the single-screen mode is changed to the channel-search view mode, the controller 9 issues an instruction to the second tuner 2 to shifting into the channel-search view mode. A signal indicating the change into the channel-search view mode is then to the multi-window processor 8. At this time, the third switch SW3 is connected to the switch terminal S6 under the control of the controller 9, while the second switch SW2 is connected to the switch terminal S4. The second switch SW2 is connected to the switch terminal S4 only when the channel-search view is displayed, while in other cases, the second switch SW2 is kept connected to the switch terminal S3. That is, the second switch SW2 is connected to the multi-window processor 8 only when the multi-window view is displayed for executing the channel-search operation. So, the multi-window view signal is supplied from the multi-window processor 8 to the display 11 through the signal path C which passes through the multi-screen processor 6. Thus the multi-window view for the channel-search operation can be displayed on the display 11 in the single-screen or the double-screen mode. Further, the multi-screen processor 6 is optionally prepared to combine the compressed first picture signal from the main picture compressor 4 with the multi-window view signal from the multi-window processor 8, or exclusively deliver the multi-window view signal from the multi-window processor 8. The operation change of the multi-screen processor 6 is performed under the control of the controller 9.

Further, when the channel-search is carried out on the channel-search view, the controller 9 is informed of it by the operation unit. The controller 9 issues an instruction to the second tuner 2 to change from the channel-search view mode to the sub-picture display mode. At this time, the third switch SW3 is connected to the switch terminal S5 by a control signal from the controller 9. In this case, the controller 9 sends a control signal to the first switch SW1 for selecting the switch terminal S2 only when the first switch SW1 has been connected to the switch terminal S1. When the channel-search is performed on the channel-search view it is carried out at the second tuner 2 and therefore, signals from the first tuner 1 are displayed in the single-screen mode, and only when the first switch SW1 is kept connected to the switch terminal S1 is the first switch SW1 connected to the switch terminal S2 at the time when the display has been changed from the channel-search view mode to the sub-picture display mode.

Figure 2A:
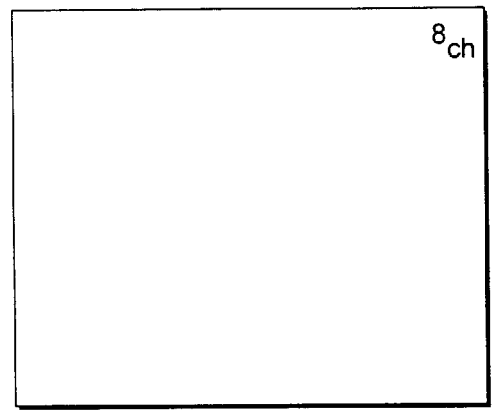
FIG. 2 is an explanatory drawing when the channel-search operation is carried out in the single-screen mode.
Figure 2:
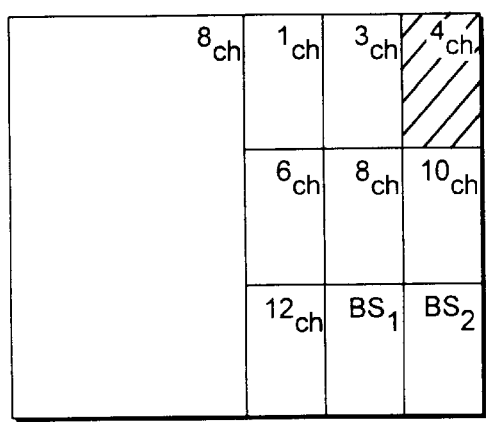
Figure 2B:
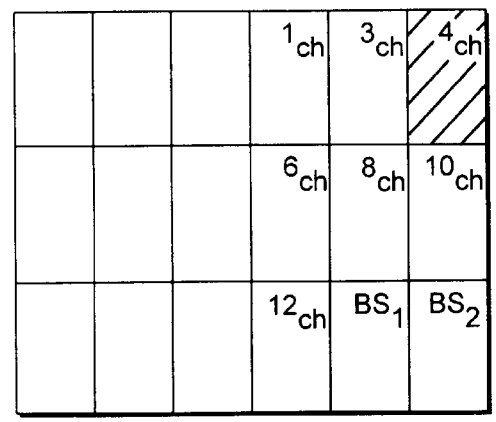
Figure 2C:
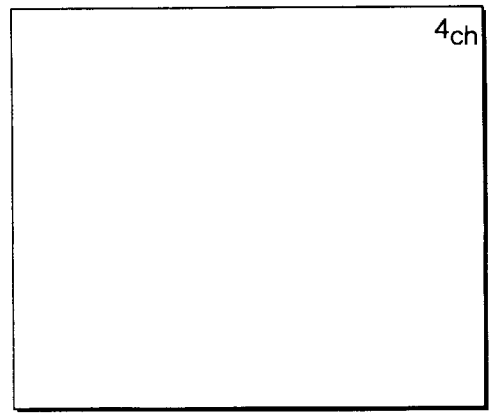

Therefore, as shown in FIGS 2(*a*), 2(*b*), 2(*b*1) and 2(*c*), the screen on the display 11 is changed to the multi-window view for the channel-search operation. When the channel-search operation has been carried out on the multi-window view screen, the last screen mode just before the channel-search operation is automatically restored on the display 11 while displaying the newly selected channel picture in the single-screen mode or the multi-screen mode.

Now, the double-screen mode of the display 11 will be described.

In the double-screen mode, the switches SW1, SW2 and SW3 are connected to the switch terminals S1, S3 and S6, respectively. At this time, if a search instruction is issued to the controller 9 from the interface 12, the controller 9 provides the instruction to change the second tuner 2 from the sub-picture display mode to the channel-search view mode. Further, the controller 9 controls the second switch SW2 to select the switch terminal S4 upon receipt of the channel-search instruction from the interface 12. Accordingly, the multi-window view prepared by the multi-window processor 8 is displayed in the sub-screen on the display 11 and it becomes possible to perform the channel-search operation on the display 11. After the channel-search operation has been carried out, the second tuner 2 is changed to the sub-picture display mode and the selected channel picture is displayed in the sub-screen. So, as shown in FIGS. 3(*a*), 3(*b*) and 3(*c*), it becomes possible to make the channel-search on two screens and enjoy pictures of a desired channel automatically after selecting the channel.

Further, the first and the second tuners 1 and 2 are provided with an amplifier, a detector, a synch-separator, a Y/C separator and a deflector for processing the picture signals in their practical circuit arrangements. However, in FIG. 1 only the signal paths of the picture signal are presented the simplicity of explanation. Further, synch-signals obtained from such a synch-separator are supplied to the sub-picture compressor 7 and the multi-window processor 8 in addition to the deflector so that circuit elements constituting the first and the second tuner 1 and 2 operate synchronous with each other.

The multi-window processor 8 is provided with a picture memory (not shown) for sequentially storing a plurality of broadcast channel picture signals by compressing them in both of the horizontal and vertical directions. In the sequential operation, when a memory operation for one of the broadcast channel picture signals has been completed, the completion of the memory operation is informed to the controller 9 for shifting the memory operation to another one of the broadcast channel picture signals. In such a manner, the memory operation is repetitively carried out on all of the broadcast channel picture signals, so that all of the broadcast channel picture signals are stored in the picture memory. The stored picture signals are read out at a clock frequency which is synchronous with the horizontal sync-signal and the vertical sync-signal. The read-out picture signals thus constituting the multi-window view signal are supplied to the multi-screen processor 6.

Now, the operation of the television receiver as shown in FIG. 1 will be described.

First, a case where the multi-window view for the channel-search operation is displayed on the display 11 in the single-screen mode will be described in reference to FIGS. 2(*a*), 2(*b*), 2(*b*1) and 2(*c*).

In this case, as shown in FIG. 2(*a*), the picture signal of the previously selected channel is initially displayed. When an instruction for shifting to the multi-window view for the channel-search operation is issued to the controller 9 from the interface 12, the second and third switches SW2 and SW3 are switched to the switch terminal S4 and the switch terminal S6, respectively. Therefore, the multi-window view signal prepared in the multi-window processor 8 is supplied to the display 11 through the multi-screen processor 6. At this time, the multi-screen processor 6 operates to present the multi-window view signal on the display 11 in the single-screen mode. Thus the multi-window view is presented in the full screen on the display 11, as shown in FIG. 2(*b*). As a result, the channel-search operation becomes ready to be carried out on the sub-screen presenting the multi-picture view.

Because the channel-search is performed in association with the second tuner 2, when the controller 9 is informed of a desired channel to be selected in the channel-search operation, the controller 9 provides the second tuner 2 with an instruction for changing the channel-search view mode to the sub-picture display mode so that, the second tuner 2 outputs the picture signal of the newly selected channel. Further, the controller 9 supplies mode change instructions to the first and second switches SW1 and SW2 to establish the signal path B. At the same time that the channel-search operation has been completed, the second picture signal from the second tuner 2 is supplied to the display 11 through the signal path established by the first and second switches SW1 and SW2. Thus the second picture is displayed, as shown in FIG. 2(*c*). Because the terminal selecting states in the switches SW1 and SW2 as well as the operating states of the respective units of the television receiver before the channel-search operation are stored in the memory 10, the last screen mode of the display 11 before the channel-search operation is automatically restored based on the terminal selecting states and the operating states of the respective units stored in the memory 10. According to the arrangement as described above, it becomes possible to display the pictures selected in the single-screen mode before the channel-search.

Further, it is also possible to display the multi-window view in the half-screen on the display 11, as shown in FIG. 2(b1). In this case, it is possible to carry out the channel-search in the right half screen of the display 11, while displaying the picture of the previously selected channel in the other half screen, i.e., the left half screen of the display 11. This change can be easily achieved by connecting the signal path from the multi-screen processor 6 to the multi-window processor 8 under the control of the controller 9 while supplying the multi-window processor 8 with information specifying the screen size etc.

Figure 3A:
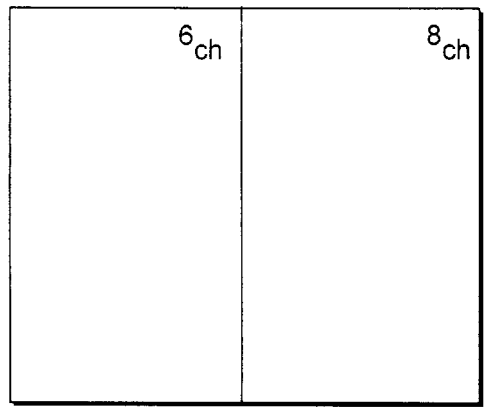
FIG. 3 is an explanatory drawing when the channel-search operation is carried out in the double-screen mode.
Figure 3B:
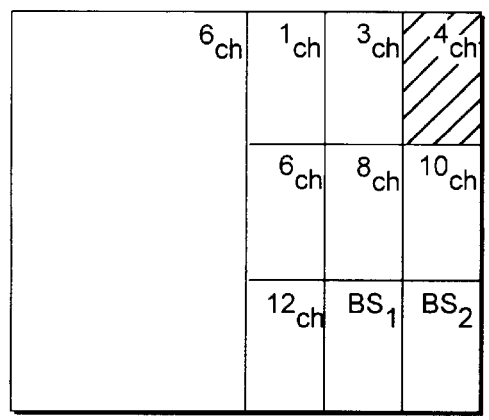
Figure 3C:
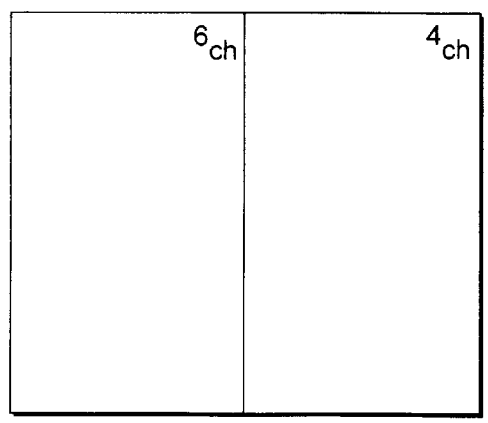

Referring now to FIGS. 3(a), 3(b) and 3(c), the case of the channel-search operation in the double-screen mode where the multi-window view is applied to the sub-screen prepared by the multi-screen processor 6 will be described.

In this case, two pictures of the previously selected two channels are respectively displayed on the main screen and the sub-screen before the channel-search operation, as shown in FIG. 3(a). When an instruction for changing into the channel-search view mode is issued to the controller 9 from the interface 12, the second switch SW2 is switched to the switch terminal S4 under the control of the controller 9. As a result, the multi-window view signal prepared in the multi-window processor 8 is supplied to the display 11 through the signal path C instead of the second picture signal from the sub-picture compressor 7. The multi-window view is then displayed on the sub-screen of the display 11, as shown in FIG. 3(b). Thus the channel-search operation can be carried out by locating a cursor on a desired channel presenting window in the multi-window view. The second tuner 2 is changed to the channel-search view mode at the time when the channel-search mode view instruction is applied thereto. When the channel-search operation has been completed, the second tuner 2 is returned to the sub-picture display mode. Accordingly, the compressed second picture signal from the sub-picture compressor 7 is supplied to the display 11 and thus the screen mode as shown in FIG. 3(c) is obtained.

This construction makes it possible to automatically return to the previous screen mode without any additional user instruction after the channel-search operation has been completed.

Figure 4:
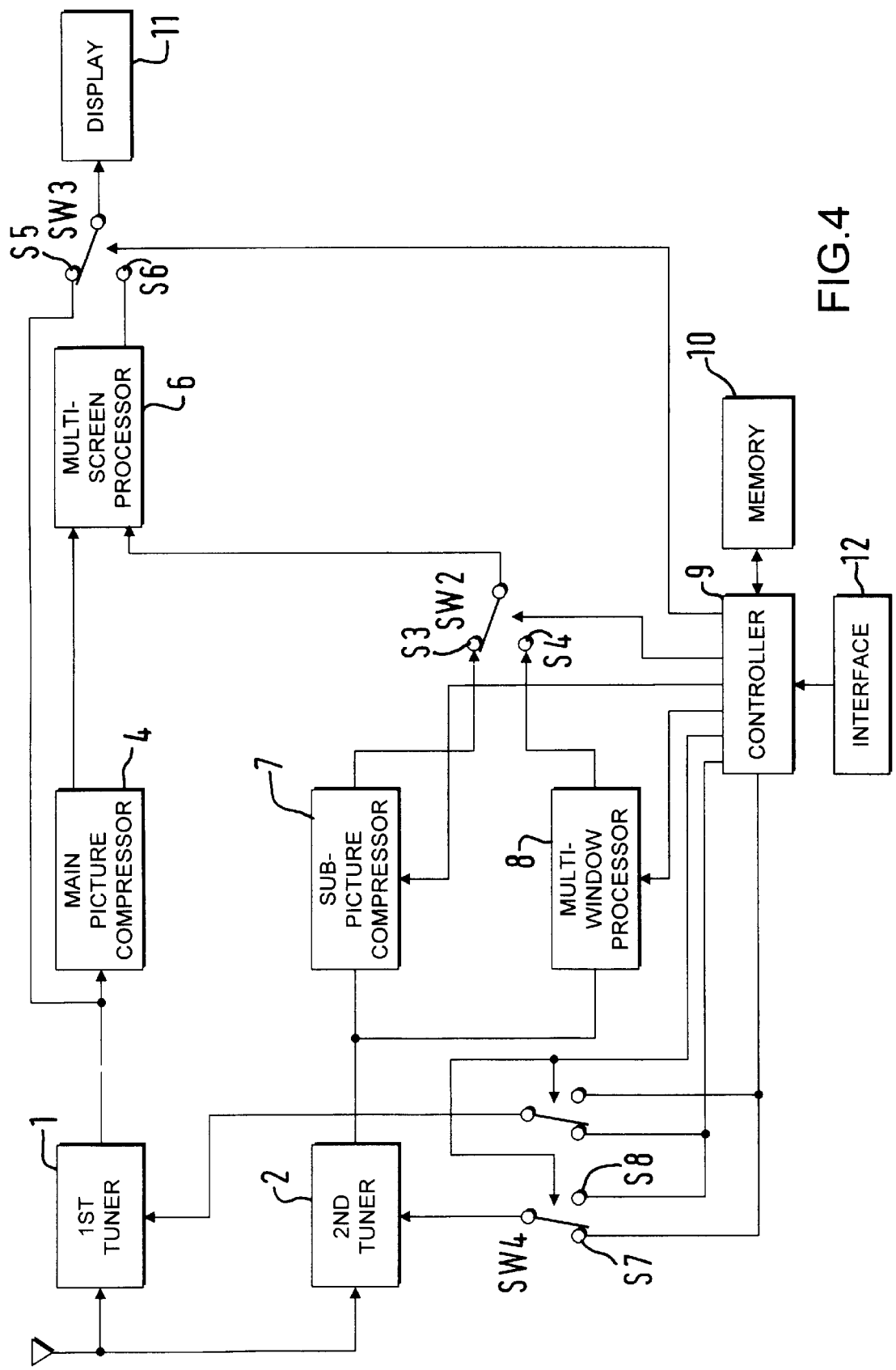
FIG. 4 is a block diagram showing a second embodiment of a television receiver according to the present invention.
Figure 5:
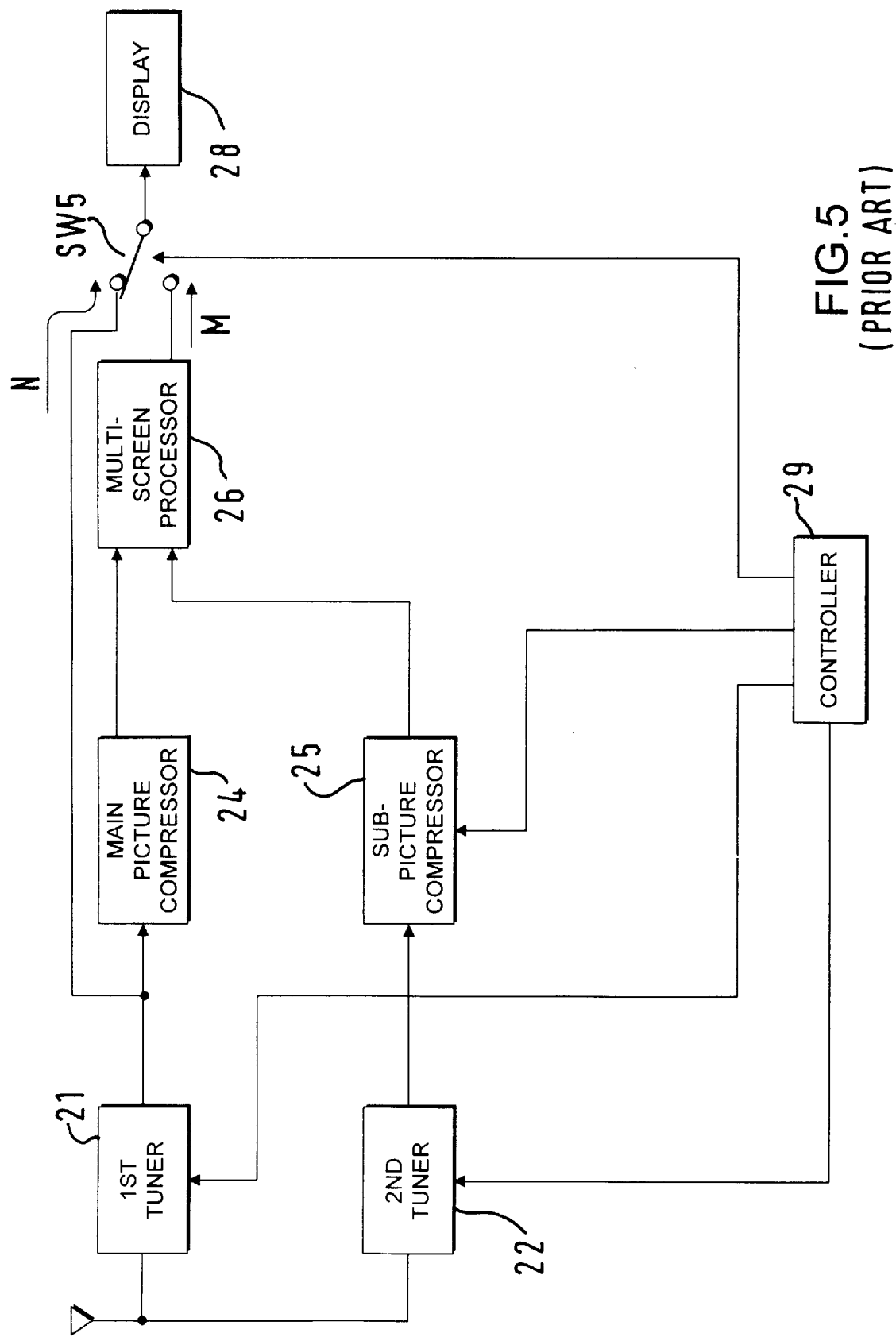
FIG. 5 is a block diagram showing a conventional television receiver wherein the channel-search operation is carried out in the double-screen mode.
Figure 6:
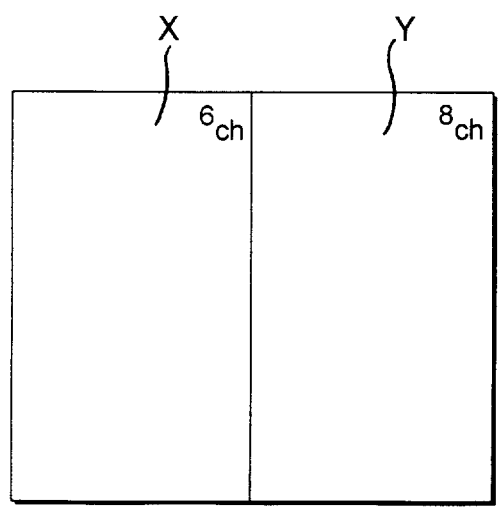
FIG. 6 is a diagram for explaining general concept of the double-screen display.

Referring now to FIG. 4, a second embodiment of the television receiver according to the present invention will be described.

In this embodiment, the first switch SW1 in the first embodiment is eliminated, while an interlocked pair-switch SW4 provides control signal paths for the first and second tuners 1 and 2 from the controller 9.

In order to carry out the channel-search operation on the multi-window view, i.e., the channel-search view associated with the second tuner 2, individual switch sections of the interlocked pair-switch SW4 are switched from the switch terminal S7 to the switch terminal S8, while the control signal paths given from the controller 9 to the first and second tuners 1, 2 are switched between each other. That is, a tuning control signal supplied from the controller 9 is supplied to the first tuner 1 instead of the second tuner 2 at the time that the screen mode on the display 11 has been changed from the channel-search view mode to the sub-picture display view mode.

Accordingly, because the channel-search is performed in association with the second tuner 2, it becomes possible to display the picture of the newly selected channel in almost the same states as those in the first embodiment, as shown in FIG. 1.

According to the above arrangement, the second embodiment of the present invention is able to display the multi-window view only when the channel-search operation is carried out, as in the case with the first embodiment, as shown in FIG. 1. Thus, after the channel-search operation has been completed the newly selected channel picture is automatically displayed.

The television receiver according to the present invention has characteristics such that it is not only possible to carry out the channel-search operation on one half of the display screen while displaying pictures of selected channel on the other half of the display screen, but it is also possible to automatically return to the screen mode existing just before the channel-search operation has been instructed to begin.

As described above, the present invention can provide an extremely preferable television receiver.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer or alternative inventive concepts that are included in the contents of the application and could be defined by claims differing in scope from the following claims, which different claims may be adopted subsequently during prosecution, for example, for the purposes of a divisional application.

What is claimed is:

1. A television receiver, comprising:

means for receiving broadcast TV signals;

an interface for receiving an instruction from a user;

a first tuner for generating a first picture signal selected from the broadcast TV signals received by the receiving means in response to the instruction from the interface;

a second tuner for generating a second picture signal from the broadcast TV signals received by the received means in response to the instruction from the interface;

a display for displaying pictures corresponding to the picture signals generated by the first and second tuners in a single-screen mode or a multi-screen mode;

a multi-screen processor for displaying at least two screens on the display, the display being capable of simultaneously displaying the picture signals from the first and second tuners in the multi-screen mode;

a multi-window processor responsive to the picture signal from the second tuner for providing a multi-window view capable of presenting a plurality of pictures on the display corresponding to the broadcast TV signals, the multi-window view presenting the plurality of pictures in either the single-screen mode or the multi-screen mode based on the instruction from the interface to allow the user to request a channel-search operation and select a desired channel picture signal from the multi-window view; and a controller responsive to the completion of the channel-search operation for automatically returning the display to the screen mode existing at the time the channel-search operation was requested and providing the selected channel picture signal to the display.

2. A television receiver, comprising:

means for receiving broadcast TV signals;

an interface for receiving an instruction from a user;

a first tuner for generating a main picture signal selected from the broadcast TV signals received by the receiving means in response to the instruction from the interface;

a second tuner for selectively generating a sub-picture mode signal or a channel-search mode signal containing a plurality of picture signals, the sub-picture signal and the channel-search mode signal being selected from the broadcast TV signals received by the receiving means, in response to the instruction from the interface;

a display for displaying pictures in a single screen mode or a multi-screen mode;

a first switch for selectively outputting signals from the first tuner and signals from the second tuner;

a main picture compressor for outputting the main picture signal from the first tuner by compressing in the horizontal direction a main picture corresponding to the main picture signal;

a sub-picture compressor for compressing in the horizontal direction a sub-picture corresponding to the sub-picture signal from the second tuner;

a multi-window processor for outputting the plurality of picture signals in the channel-search mode signal from the second tuner by splitting the plurality of picture signals and compressing a plurality of pictures corresponding to the plurality of picture signals in the horizontal and vertical directions for display on multiple screens as reduced-size pictures;

a second switch for selectively outputting signals from the sub-picture compressor and signals from the multi-window processor;

a multi-screen processor for combining the picture signals from the sub-picture compressor or signals from the multi-window processor, selected by the second switch, and the main picture signal from the main picture compressor;

a third switch for selectively providing the picture signal from the multi-screen processor or the picture signal, selected by the first switch, to the display; and a controller responsive to the interface for controlling the first and second tuner, the first, second, and third switches, and the multi-window processor such that, when pictures are displayed in the single-screen mode, the channel-search operation displays multiple pictures in the single-screen mode by switching the second and third switches to form a signal path containing the multi-window processor for displaying the multi-window view on the display, and after the channel-search operation has been completed, the second tuner is switched from the channel-search mode to the sub-picture display mode and the first and third switches are switched to display the picture signal from the second tuner on the display, and when pictures are displayed in the multi-screen mode, the second switch is switched to create a signal path containing the multi-window processor for carrying out the channel-search operation to display the multi-window view on the display and after the channel-search operation has been completed, the second tuner is changed from the channel-search mode to the sub-picture mode, and the second switch is switched to form a signal path containing the sub-picture compressor to display picture signals from the first and second tuners on the display.

3. A television receiver as claimed in claim 2, wherein the controller is coupled to a memory for storing terminal selections of the first, second and third switches just before the channel-search operation begins in order to return to the screen mode existing at the time the channel-search operation was requested.

4. A television receiver, comprising:

means for receiving broadcast TV signals;

an interface for receiving an instruction from a user;

a first tuner for generating a main picture signal selected from the broadcast TV signals received by the receiving means in response to the instruction from the interface;

a second tuner for selectively generating a sub-picture signal or a channel-search mode signal containing a plurality of picture signals, the sub-picture mode signal and the channel-search mode signal being selected from the broadcast TV signals received by the receiving means in response to the instruction from the interface;

a display for displaying pictures in a single-screen mode or a multi-screen mode;

a first switch for selectively outputting signals from the first and second tuners;

a main picture compressor for compressing in the horizontal direction a main picture corresponding to the main picture signal from the first tuner a sub-picture compressor for compressing in the horizontal direction a sub-picture corresponding to the sub-picture signal from the second tuner;

a multi-window processor for outputting the plurality of picture signals in the channel-search mode signal from the second tuner by splitting the plurality of picture signals and compressing a plurality of pictures corresponding to the plurality of picture signals in the horizontal and vertical directions for display on multiple screens as reduced-size pictures;

a second switch for selectively outputting signals from the sub-picture compressor and signals from the multi-window processor;

a multi-screen processor for combining the signals from the sub-picture compressor or signals from the multi-window processor, selected by the second switch, and the main picture signal from the main picture compressor;

a third switch for selectively providing the picture signal from the multi-screen processor or the picture signal, selected by the first switch, to the display; and a controller responsive to the interface for controlling the first and second tuner, the first, second, and third switches, and the multi-window processor such that, when pictures are displayed in the single-screen mode, the channel-search operation displays multiple pictures in the single-screen mode by switching the second and third switches to form a signal path containing the multi-window processor for displaying the multi-window view on the display, and after the channel-search operation has been completed, the first switch is switched to display the picture signal from the first tuner on the display, and when pictures are displayed in the multi-screen mode, the second switch is switched to form a signal path containing the multi-window processor for carrying out the channel-search operation to display the multi-window view on the display, while after the channel-search operation has been completed, the second tuner is changed from the channel-search mode to the sub-picture mode, and the second switch is switched to form a signal path containing the sub-picture compressor to display from the first and second tuners on the display.

5. A television receiver as claimed in claim 4, wherein the controller is coupled to a memory for storing terminal selections of the first, second and third switches and operating states of the first and second tuner, the first, second, and third switches, and the multi-window processor before the channel-search operation begins in order to return to the setting states of the switches existing at the time the channel search operation was requested.

6. A television receiver as claimed in claim 1, wherein said controller includes:

storage means for, responsive to receipt of said instruction by said interface, storing data indicative of the screen mode existing at the time the channel-search operation was requested; and returning means for reading the data stored in the storage means and returning the display to the screen mode indicated by the data.

7. A television receiver as claimed in claim 6, wherein:

said storage means is further for storing data indicative of a single-screen mode and a multi-screen mode; and said returning means is for, responsive to said data stored in said storage means, returning said display to one of said single-screen mode and said multi-screen mode.

8. A television receiver as claimed in claim 1, wherein said controller includes control means for controlling said display to display a predetermined number of pictures simultaneously, subsequently controlling said display to display said multi-window view as one of said pictures responsive to receipt of said instruction by said interface, and subsequent thereto controlling said display to display said predetermined number of pictures simultaneously.

9. A television receiver as claimed in claim 8, wherein said controller further includes setting means for, responsive to an instruction to said interface from said user, selectively setting said predetermined number to be one of one and two.

10. A television receiver as claimed in claim 8, wherein one picture in said predetermined number of pictures displayed simultaneously after display of said multi-window view is a picture displayed in said multi-window view.

11. A television receiver as claimed in claim 1, wherein said controller includes control means for controlling said display to display a predetermined number of pictures simultaneously, subsequently controlling said display to display a single picture consisting of said multi-window view responsive to receipt of said instruction by said interface, and subsequent thereto controlling said display to display said predetermined number of pictures.

12. A television receiver as claimed in claim 11, wherein said controller further includes setting means for, responsive to an instruction to said interface from said user, selectively setting said predetermined number to be one of one and two.

13. A television receiver as claimed in claim 11, wherein one picture in said predetermined number of pictures displayed simultaneously after display of said multi-window view is a picture displayed in said multi-window view.

\* \* \* \* \*